United States Patent
Kwak et al.

(10) Patent No.: US 6,665,279 B1
(45) Date of Patent: Dec. 16, 2003

(54) WIDE BAND WIRELESS MULTIMEDIA COMMUNICATION SYSTEM

(75) Inventors: Ok Moon Kwak, Kyungki-do (KR); Kwang Joo Choi, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/224,800

(22) Filed: Dec. 31, 1998

(30) Foreign Application Priority Data

Nov. 27, 1998 (KR) .............................. 98-51208

(51) Int. Cl.[7] .............................. H04Q 7/00; H04Q 7/20
(52) U.S. Cl. ........................ 370/328; 455/446
(58) Field of Search ................... 370/310, 328, 370/329, 338; 455/3.01, 3.05, 422, 446, 447, 561, 562; 343/853; 342/350, 360, 361

(56) References Cited

U.S. PATENT DOCUMENTS

| | | | | |
|---|---|---|---|---|
| 5,459,759 A | * | 10/1995 | Schilling | 375/133 |
| 5,668,610 A | * | 9/1997 | Bossard et al. | 455/422 |
| 5,838,670 A | * | 11/1998 | Billstrom | 370/328 |
| 6,006,069 A | * | 12/1999 | Langston | 455/524 |
| 6,078,815 A | * | 6/2000 | Edwards | 455/422 |
| 6,141,557 A | * | 10/2000 | Dipiazza | 455/446 |
| 6,243,565 B1 | * | 6/2001 | Smith et al. | 375/299 |
| 6,275,704 B1 | * | 8/2001 | Dixon | 455/422 |
| 6,405,044 B1 | * | 6/2002 | Smith et al. | 370/329 |
| 2001/0012780 A1 | * | 8/2001 | Edwards | 455/446 |

\* cited by examiner

*Primary Examiner*—Seema S. Rao
*Assistant Examiner*—Kevin C. Harper
(74) *Attorney, Agent, or Firm*—Fleshner & Kim, LLP (57) ABSTRACT

Disclosed is a local multipoint distribution service(LMDS) system, in which the cost for installation and maintenance is lower comparing to a cable communication system, it takes a little time to install the system, and a variety multimedia communication services can be provided. According to one feature of the present invention, the LMDS system comprises a data/signal handler for multiplexing and modulating packet data received from a network, and for demodulating and demultiplexing an optical signal received; and at least one base stations for down-converting the multiplexed and modulated packet data into a radio frequency(RF) signal, and for converting an RF signal received into an optical signal so as to send to the data/signal handler.

12 Claims, 8 Drawing Sheets

WIDE BAND WIRELESS MULTIMEDIA COMMUNICATION SYSTEM

BACKGROUND OF THE INVENTION

1. Field of the Invention

The present invention relates to a wide band wireless communication system. More particularly, this invention relates to a local multipoint distribution service(LMDS) system which can provide subscribers who are networked through a wireless network with a variety of wireless multimedia service, such as a wireless local loop(WLL), a local area network(LAN), a community antenna television system(CATV), etc.

2. Description of the Related Arts

According to a recent day high computerization, mobile network companies have been developing communication systems capable of servicing any format of data in any place at any time. In this situation, a cable multimedia communication system was provided, which used as data various information, such as characters, numerals, image and audio data, etc. However, in the cable multimedia communication system, it takes very long times to construct a whole network, and the network must be replaced every 7 years to keep high quality images. Moreover, the cable is vulnerable to natural calamity, such as a rainfall, a snowfall, etc.

Therefore, to improve the above problems, a wide band wireless multimedia communication system has been developed. However, the wireless multimedia communication system has not yet become common, and companies do not need to open their knowhow about it.

One of the wide band wireless communication systems, is a local multipoint distribution service(LMDS). LMDS is a wide band wireless commercial network service which provides a super-high speed wide band multimedia service using a subscriber's loop frequency band of a millimeter wave band, whose upstream frequency is from 24.25 to 24.75 GHz and downstream frequency is from 25.5 to 27.5 GHz. Service items are a voice telephone, a data communication, a conversational image service, an audio-data-image-combined multimedia service, a line leasing service, etc. Subscribers can be public citizens, private network subscribers, public network transfer relayers, etc. Service area is about 2–5 km. Now DAVIC(Digital Audio-Visual Council) is suggesting a standard specification for LMDS.

Figure 1:
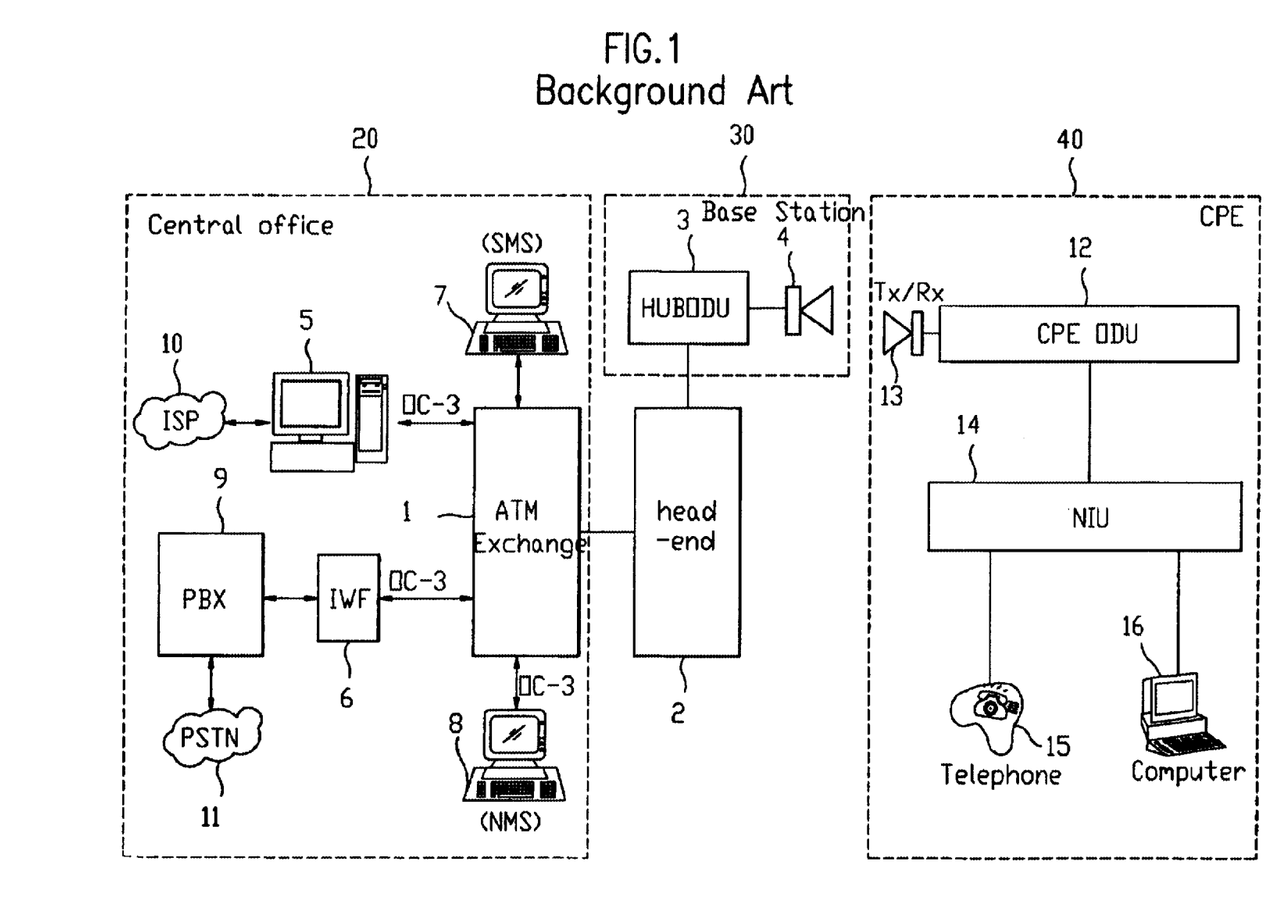
FIG. 1 is a block diagram showing a general wide band wireless multimedia communication system.

FIG. 1 is a brief structure of a conventional wide band wireless multimedia communication system. In construction, a general wide band wireless multimedia communication system is organized by a central office 20 for multiplexing packet data and supervising a whole network and every subscribers; a plurality of head ends 2 for demultiplexing traffic signals from the central office 20 and modulating the demultiplexed signals into optical signals, or for demodulating and multiplexing optical signals received and transferring the multiplexed signals to the central office 20; a plurality of base stations 30 for converting optical signals from the head ends 2 into electrical signals and amplifying it to transmit to the receiving end subscriber, or for converting the radio frequency(RF) signals received from the sending end subscriber into intermediate frequency(IF) signals and converting them into optical signals to transmit to the head ends 2; and a customer premises equipment(CPE) 40 for treating the signals received from the base stations 30 and provides the treated signals to final peripherals, or for converting the peripheral-transmitted data into an ATM cell structure to send to the base station 30.

The customer premises equipment 40 is composed of an outdoor unit(CPE ODU) 12, an antenna 13, a network interface unit(NIU) 14, a telephone 15, a computer 16.

In FIG. 1, an ATM(asynchronous transfer mode) exchange 1 analyzes ATM cell-based data used in LMDS system and exchanges the data. The head ends 2 communicate with the units in the central office 20, send data to the customer premises equipment 40, and handle the data sent down from the customer premises equipment 40 so as to send to the units in the central office 20. The hub outdoor unit(HUB ODU) 3, with the antenna 4 thereof, converts the signals from the head ends 2 into upstream format so as to radiate it in RF signal, or converts the signal from the customer premises equipment 40 into downstream format so as to provide it to the head ends 2. The internet gateway 5 is used for providing the customer premises equipment 40 with an ATM-LAN service. An interworking function(IWF) 6 matches, when data is exchanged between the ATM exchange 1 and a private branch exchange(PBX) 9, the ATM exchange 1 and the PBX 9 so that they can operate in linkage. To perform this, the IWF 6 is equipped in hardware and software modules. A network management system (NMS) 8 plays a role in managing the network status between the ATM exchange 110 and the hub outdoor unit 3. It also manages the status of the wireless channel between it and the customer premises equipment unit 40. The PBX 9 plays a role in managing the billing information to the customer premises equipment unit 400, when using a WLL (wireless local loop) as a private network service. In addition, it operates in linkage with PSTN in order to perform a data communication. An internet service provider ISP 10 means an access network for an internet service.

Figure 2:
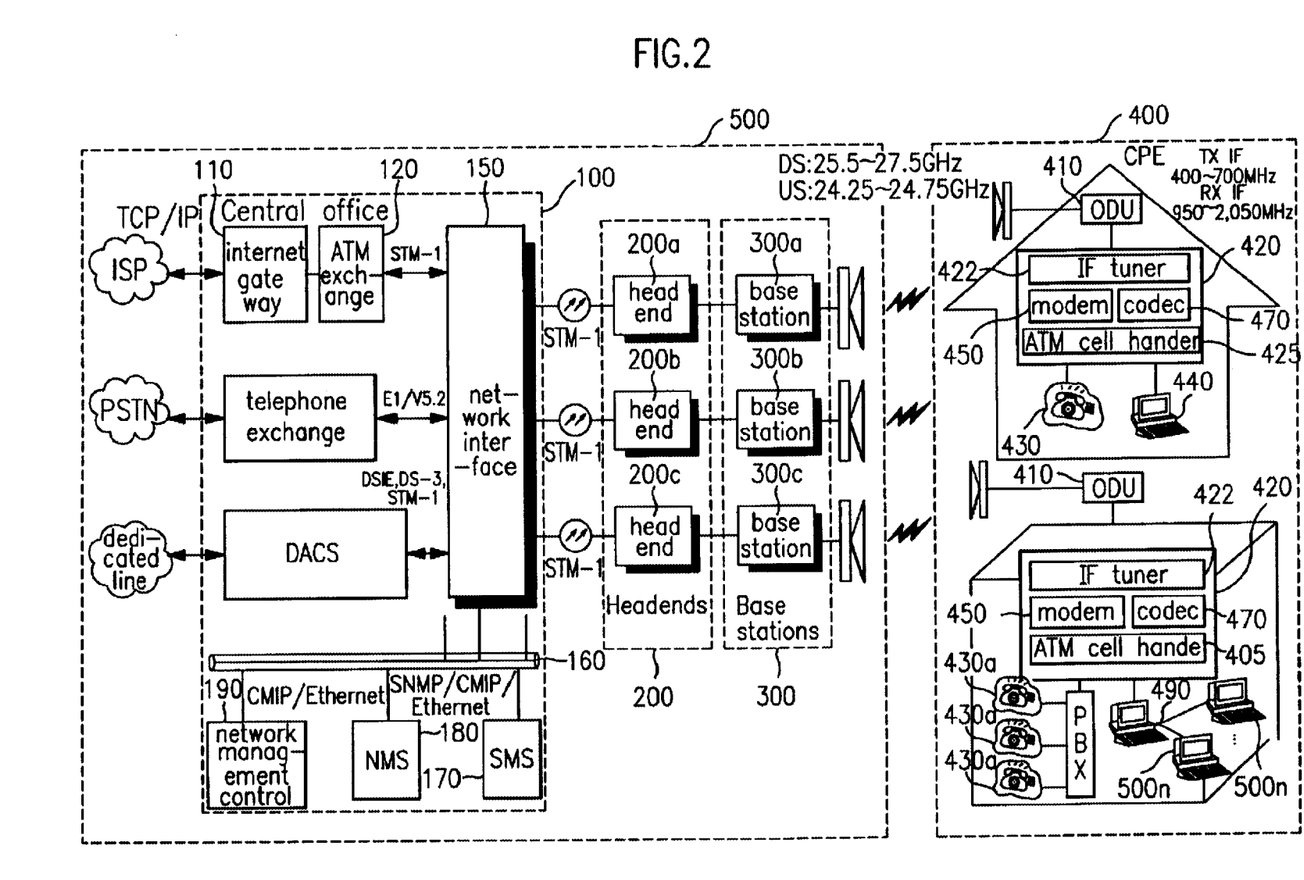
FIG. 2 is a block diagram showing a conventional wide band wireless multimedia communication system.

FIG. 2 is a detailed organization of the wide band wireless multimedia communication system shown in FIG. 1. With reference to FIG. 2, a central office 100 is organized by an internet gateway 110 for providing a customer premises equipment 400 with an ATM-LAN service; an exchange 120 for analyzing the ATM cell-based data and exchanging them; a telephone switch 130 for interswitching the telephones connected to a public switched telephone network(PSTN); a digital access and cross-connected system(DACS) 140 for multiplexing and demultiplexing many dedicated lines; a network interface 150 for routing, multiplexing, and demultiplexing the data stream transmitted from the exchange 120, the telephone switch 130, and the DACS 140; an Ethernet bus 160 connected with the network interface 150; a subscriber management system(SMS) 170 for managing the operational status of and the information on the at least one customer premises equipment 400; a network management system(NMS) 180 for managing the network operational status between the head ends 200 and the base station 300, and for managing the status of the wireless channel between it and the customer premises equipment unit 400; and a network management control 190 for managing the at least one NMSes 180.

Figure 3:
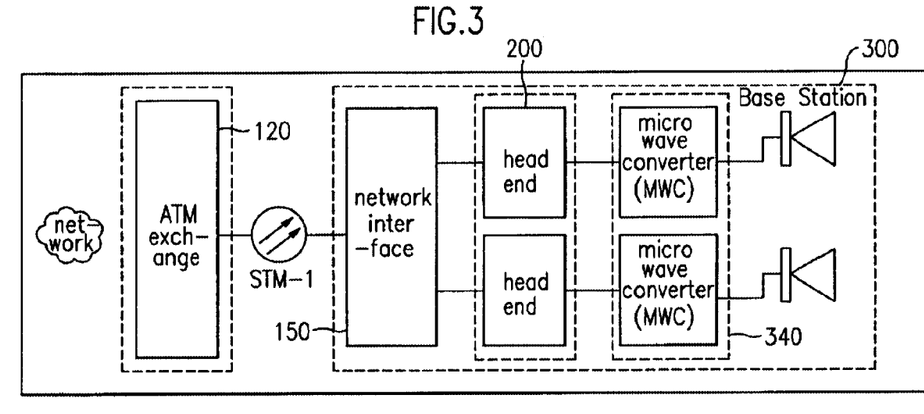
FIG. 3 is a block diagram showing the interconnection between the ATM exchange, network interface, and head ends shown in FIG. 2.

FIG. 3 shows an interconnection between the exchange 120, the network interface 150, and the head ends 200 shown in FIG. 1. FIG. 3 shows that a channel card is supervised by a base station 300 which is belonged to the head ends 200, in a base station of a communication company using LMDS system, e.g., CATV company. In FIG. 3, the exchange 120 of the central office 100 and the network interface 150 of the base station 300 are connected via STM-1 grade SDH transmitter. Herein, the network interface 150 plays a role of an ATM exchange, and is installed in the operation room of the base station 300, with the head ends 200. In addition, microwave converters(MWCs) 340 are installed in an outdoor transmission tower.

Like the above, in such a conventional communication system using LMDS system, the ATM exchange, the head ends, the base station are estranged at a long distance. Therefore, when new channels must be extended, the work must be performed at every base stations and it is necessary to add an equipment to every base stations. Moreover, every base stations must have a room for equipment setup, and, in the case of use of a ring type connection between the network interface and the hub outdoor, an SDH add/drop multiplexer is necessary. In addition, a maintenance or troubleshooting is quite inconvenience.

SUMMARY OF THE INVENTION

It is an object of the present invention to provide a local multipoint distribution service(LMDS) system, in which the cost for installation and maintenance is lower comparing to a cable communication system, it takes a little time to install the system, and a variety multimedia communication services can be provided.

It is another object of the present invention to provide a local multipoint distribution service(LMDS) system which provides a super-high speed wide band multimedia service using a subscriber's loop frequency band of a millimeter wave band, so that it can provide subscribers with a wireless Internet, a wireless local loop, line leasing service, etc., in linkage with an ATM-based cable network.

It is yet another object of the present invention to provide a wide band wireless multimedia communication system having a proper frequency arrangement structure that does not affect the same channels of the base station and the subscribers when the base station is divided into two frequencies per a cell or the different frequencies are used at every sectors of the respective base stations.

According to one feature of the present invention to achieve the object, an LMDS system according to the present invention comprises a data/signal handler for multiplexing and modulating packet data received from a network, and for demodulating and demultiplexing an optical signal received; and at least one base stations for down-converting the multiplexed and modulated packet data into a radio frequency(RF) signal, and for converting an RF signal received into an optical signal so as to send to the data/signal handler.

According to another feature of the present invention to achieve the another object, an LMDS system according to the present invention for a wide band wireless multimedia communication system is characterized in that cells of a base station is designed by setting to "1" a frequency reuse parameter(K) in which a neighboring cell can use frequency in a current cell.

BRIEF DESCRIPTION OF THE DRAWINGS

The objects, features, and advantages of the present invention will be apparent to one skilled in the art in light of the following detailed description, in which.

DETAILED DESCRIPTION OF THE PREFERRED EMBODIMENT

In the following, a preferred embodiment of the present invention will be described with reference to the attached drawings.

Figure 4:
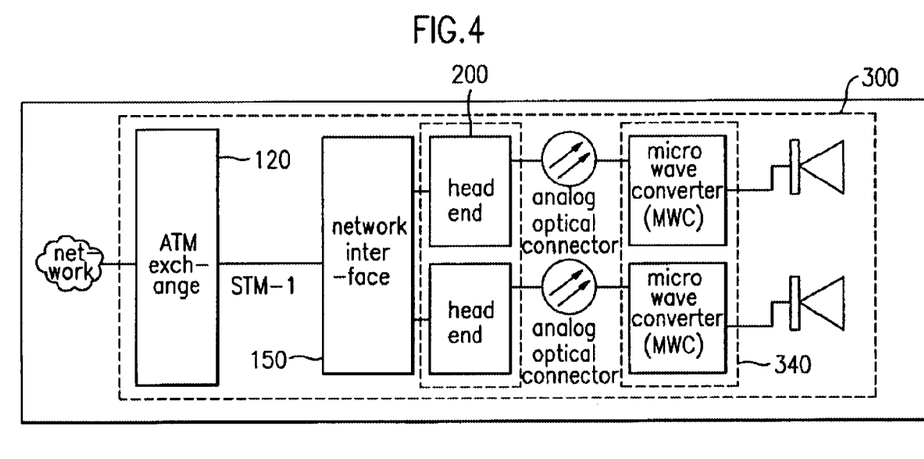
FIG. 4 is a block diagram showing the interconnection between the ATM exchange, network interface, and head ends according to the present invention.

Referring to FIG. 4, a wide band wireless multimedia communication system according to the present invention is organized by an exchange 120 for analyzing packet data used for a multimedia data communication and exchanging the analyzed data; a network interface 150 for routing, multiplexing, and demultiplexing the data stream from the exchange 120; a plurality of head ends 200 for outputting the traffic signals from the network interface 150 after demultiplexing and modulating, or for demodulating and multiplexing the input and transferring the demodulated signals to a central office 100; and a plurality of base station 300 for converting optical signals from the head ends 200 into electrical signals and amplifying it to transmit to the receiving end subscriber, or for converting the radio frequency (RF) signals received from the sending subscriber into intermediate frequency(IF) signals and converting them into optical signals to transmit to the head ends 2.

As shown in FIG. 4, because the exchange 120, network interface 150, head ends 200 are embedded together at a place, maintenance or trouble shooting is easy. In addition, when extending channels to the base station 300, only the microwave converters in the base station and the head ends 200 can be added. Thus, since the equipments can be concentrated in the central office 100, it is convenient to operate the base stations and to maintain them. Since the structure of the base station becomes simpler comparing to the structure in FIG. 3, equipment price can be reduced.

Figure 5:
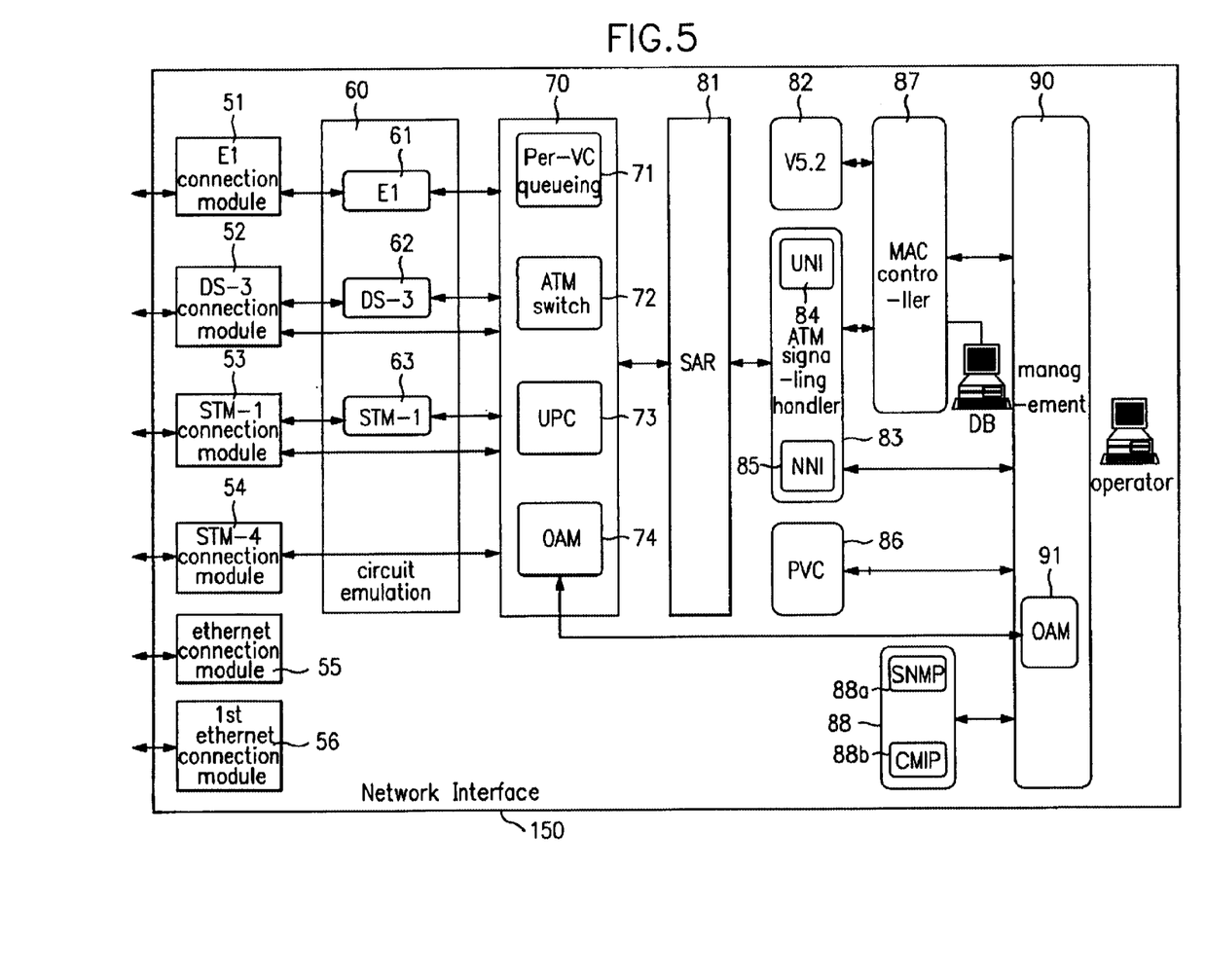
FIG. 5 is a block diagram of a network interface shown in FIG. 4.

FIG. 5 is a block diagram showing the network interface 150 shown in FIG. 4. Subscriber connection modules(an E1 connection module, a DS3 connection module, an STM-1 connection module, and an STM-4 connection module) connects the lines with the relevant modules. For example, when in use of a telephone switch 130, it connects the line with the E1 connection module 51, and when in use of the exchange, it connects DS-3 and STM-1 connection modules 52 and 53. A circuit emulation 60 is connected with a variety of an ATM or non-ATM network and forwardly and/or reversely converts the data into the cell apt to the internal system. A Per-VC queuing buffer 71 performs a packet-level buffer control and a header conversion function. A UPC (usage parameter control) 73 supervises whether traffic parameters, which were contracted by a terminal and a system when setting the call, are well observed, and according to the result, decides the cell abolition and the tagging. An OAM(operation administration and maintenance) 74 administers and maintains the status of the link in which a call is set, and the performance. An ATM switch 72 performs routing in accordance with the routing information on the input cells determined by a processor. SAR(segmentation and reassembly) 81 performs a function of segmentation and reassembly at the ATM protocol class. An ATM signaling handler 83 performs a set, maintenance, and quit of an ATM class connection message. Herein, signaling information is passed through dedicated channel, i.e., a signaling virtual channel(SVC), independently to the user information. A PVC 86 sets up in a reserved or permanent mode a point-to-point connection and a unidirectional point-to-multipoint virtual path(VP) connection or virtual channel(VC) connection. A V5.2 82 performs a telephone service protocol treatment, e.g., system start, PSTN protocol, control protocol, BCC(bearer channel connection) protocol, link control protocol, and protection protocol. A MAC controller 87 takes charge of setting, maintenance, quitting of network at user end and on the network interface. A management class 90 performs a system maintenance function.

The network interface 150 shown in FIG. 5 fundamentally carries out call treatment, signal treatment, call control, OAM, and resource control function. It receives signals from the DACS 140, the exchange 120, the telephone switch 130 through an E1 connection module 51, a DS-3 connection module 52, an STM-1 connection module 53, an STM-4 connection module 54, an Ethernet connection module 55, and a first Ethernet connection module 56, extracts a billing information by finding a frame synchronization in the respective bit streams received, and maps the relevant billing information by creating a send frames. The ATM switch 72 exchanges cells, and the UPC(usage parameter control) 73 checks violation to the contract parameters to protect network resources from the accidental malfunction or the intentional acts which are liable to affect the QoS(quality of service) of the already set up connections, and performs an action according to the checked result. The OAM 74 supervises defection or performance of a network, and, if defection is detected, detours ATM cells to the other paths or changing the current equipment to an auxiliary one. The per-VC queuing buffer 71 and the PVC 86 are provided for a line leasing service, and the V5.2 82 is for a telephone service.

The SAR 81 takes a charge of ATM cell segmentation and reassembly, and the ATM signaling handler provides an ATM service, such as CBR, VBR, UBR, ABR, in a PVC or SVC mode. At this time, either the network interface 150 can solely handle the signals without using the head ends 200, or the head ends 200 can handle the signals. In the case the network interface 150 handles the signals, MAC processor is built in the network interface 150 so that the MAC processor directly controls a subscriber's modem under the instruction of signaling handled in Q.2931 or UNI. Thus, in this method, a system realization is easy because the network interface 150 has the allocation to the signaling, setting wireless channel range between subscribers and LMDS headend, and a database to subscribers.

Figure 6:
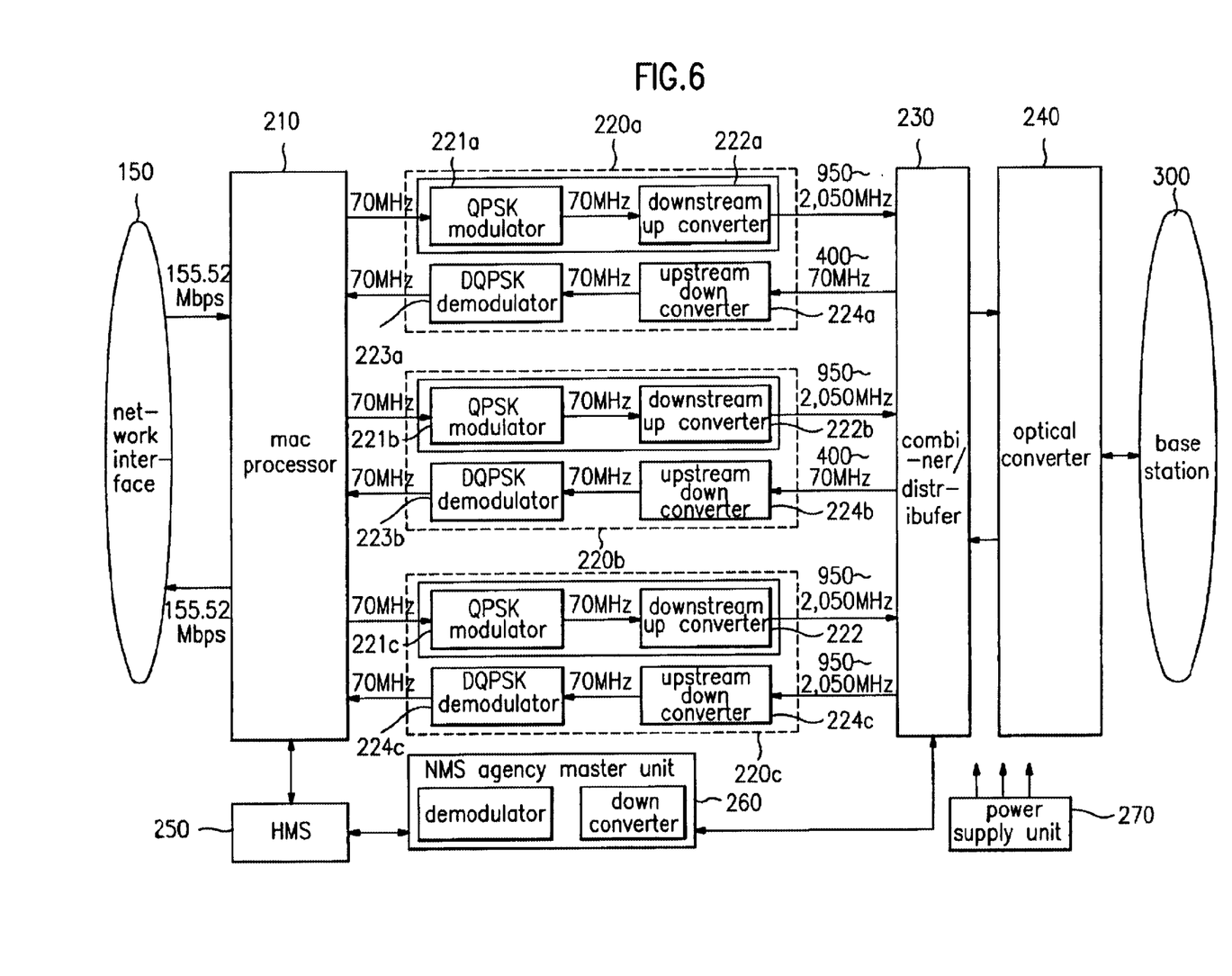
FIG. 6 is a block diagram of a headend shown in FIG. 4.

Referring to FIG. 6, the respective headend 200(shown in FIG. 4) is organized by a MAC processor 210 for multiplexing and demultiplexing the ATM data to perform STM-1 grade ATM communication with the central office 100, analyzing the data received from the central office 100, and routing the analyzed data; a plurality of up-and down-stream adjuster 220a–220c for modulating the signal from the MAC processor 210. and up-converting the channel frequency of the modulated signal, and for demodulating the channel frequency provided by the customer premises equipment 400 and down-converting the demodulated signal; a combiner/distributer 230 for combining the outputs of the up-and down-stream adjuster 220a–220c and for distributing the signal from the customer premises equipment 400; an optical converter 24 for converting the electrical output signal of the combiner/distributer 230 into the optical signal, or for converting the optical signal from the customer premises equipment 400 into the electrical signal; and a headend management server 250 for managing and supervising the status of the respective base stations 300a–300c, by continually communicating with the MAC processor 210.

Herein, the head ends 200 divide each terminal, and set fixed relationship between LI(local identifier) and VPI/VCI (virtual path identifier/virtual channel identifier) which are used for dividing each application in the respective terminals. The VPI/VCI connection corresponding to the respective LI has pre-determined attributes and they does not varied. Thus, the MAC processor 210 of the headend 200 plays a simple role in loading the information on the time slots allocated by the network interface 150, and in sending to a subscriber's modem.

Figure 7:
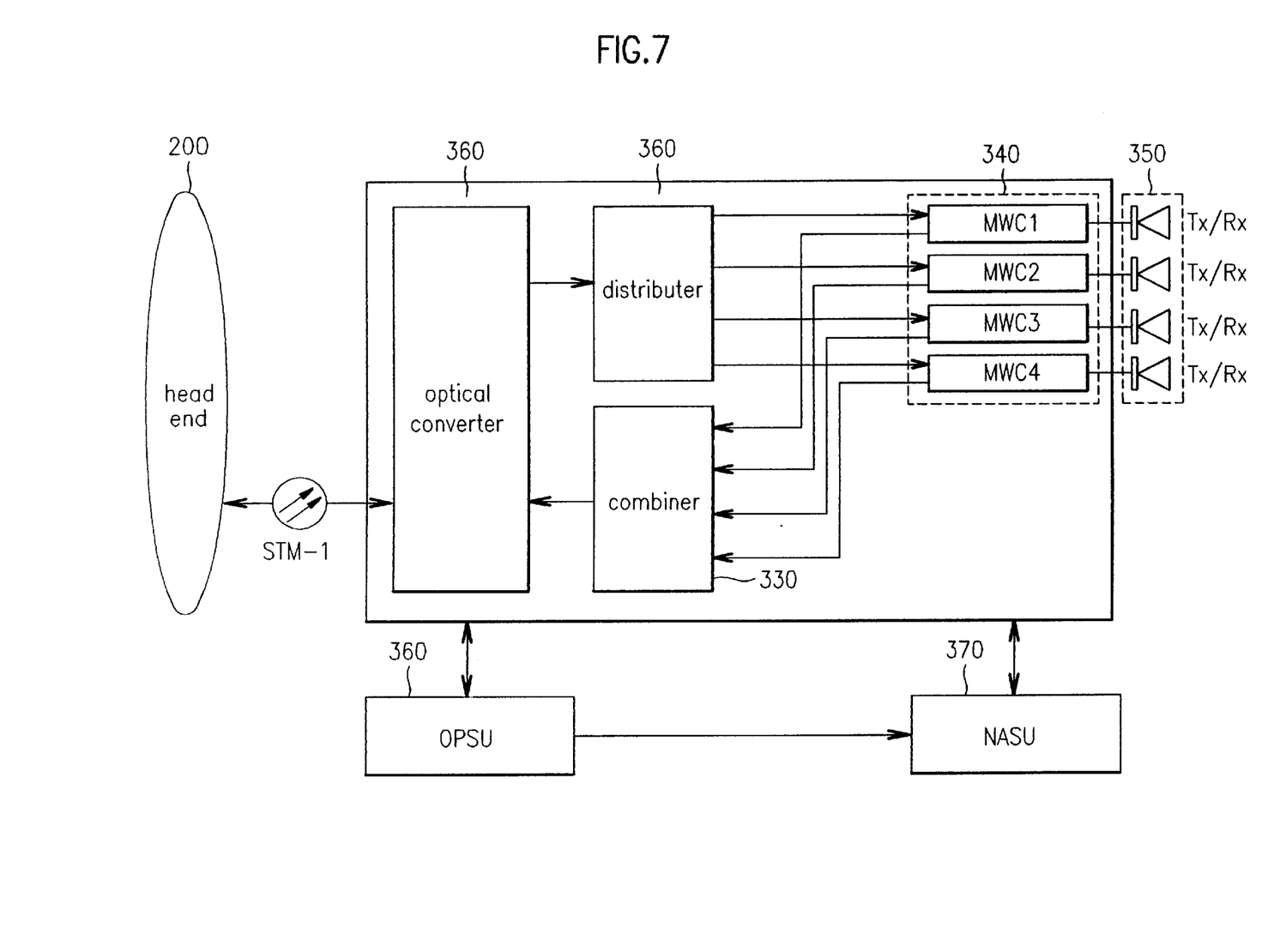
FIG. 7 is a block diagram of a base station shown in FIG. 4.

The base station is organized, as shown in FIG. 7, by an optical converter 310 for converting the output of the head ends 200 or the customer premises equipment 400 into the optical signal or the electrical signal, respectively; a distributer 320 for distributing the output of the optical converter 310; a combiner 330 for combining the signals from the customer premises equipment 400 and for providing the combined signal to the optical converter 310; a plurality of microwave converters(MWCs) 340 for frequency converting the output signal of the distributer 320 into the microwave band signal and amplifying it, or for frequency converting the microwave from the customer premises equipment 400 into the IF signal and sending it to the combiner 330; a plurality of sector antennas 350 for radiating, with four radiation beam angle, the microwave signals from the MWCs 340; network management system (NMS) agency slave unit(NASU) 370 for transferring the status of the base stations to the head ends 200 through the combiner 330; and an outdoor power supply unit(OPSU) 360 for supplying the above part with a power source and for reporting its own status to the NASU 370. In the following, the operation of a wide band wireless multimedia communication system according to an embodiment of the present invention will be described.

The central office 100 multiplexes the programs and service contents, i.e., packet data, provided from a program provider, by using the network interface, and sends the multiplexed signals to the headend. The central office 100 includes a network management system 180 for managing a whole network and a subscriber management system 170 for managing data of subscribers.

The network interface 150 shown in FIG. 4 routes, multiplexes, and demultiplexes the data stream transmitted from the exchange 120, the telephone switch 130, and the DACS 140. The exchange 120 analyzes the ATM cell-based data used for a wide band wireless multimedia communication system, and exchanges the analyzed data. The internet gateway 110 provides the customer premises equipment unit 400 with an ATM-LAN service. ISP stands for an internet service provider, which is a network for providing an internet service. The telephone switch 130 interswitches the telephones connected to a public switched telephone network(PSTN). The digital access and cross-connected system(DACS) 140 multiplexes or demultiplexes many dedicated lines, and provides the multiplexed or demultiplexed data to a net interface. The subscriber management system(SMS) 170 manages the operational status of and the information on the customer premises equipments 400. The network management system(NMS) 180 manages the network operational status between the head ends 200 and the base station 300, both of which are connected with the network interface 150, and manages the status of the wireless channel between it and the customer premises equipment unit 400. The network management control 190 manages the whole NMSes 180.

Referring to FIG. 6, the MAC processor 210 of the headend 200 multiplexes or demultiplexes the ATM data to perform an STM-1 grade ATM communication with the network interface(the ATM exchange or the private branch exchange), and analyzes the data received from the internet interface 150 and routes the analyzed data, thereby formatting the data, e.g., CBR(constant bit rate), VBR(variable bit rate), control data, such that the subscribers can read the data, and performing the signaling.

The headend 200 formats the downstream data into the format of 188 bytes that DAVIC recommends, and sends the formatted data to the QPSK modulator 221a. The MAC processor 210 receives the data transmitted through an upstream channel from the subscribers and provides the data to the network interface 150, wherein MAC data is handled by the MAC processor 210 itself. The headend management server(HMS) 250 continually communicate with the MAC processor 210 to manage the status of the headend 200, and checks the status of the base station 300, using the NMS agency master unit 260. The QPSK modulator 221a encodes the 188-byte data received from the MAC processor 210 using a Reed-Solomon algorithm, creates 204-byte data by adding 16-byte redundant data, QPSK modulates the data by performing a convolution interleaving(I=12, M=17) and a convolution encoding(R=½, K=7), and thereafter sends the 70 MHz carrier to a downstream up converter 222a. The downstream up converter 222a converts the modulated signal transmitted from a modem constructed by the QPSK modulator 221a and the downstream up converter 222a into the IF band(950–2050 MHz) channel frequency, and provides the modulated data to the combiner/distributer 230. The combiner/distributer 230 combines 3-port IF channel frequencies transmitted from the respective QPSK modulators 221a–221c, and provides the combined signal to the optical converter 240. The optical converter 240 converts the signal from the combiner/distributer 230 into the optical signal, and transmits the optical signal to the long distanced base station. The data transmitted through upstream channels from the customer premises equipment 400 is downconverted into 400–700 MHz at the base station, and is transmitted to the headend 200. The optical converter 240 of the headend 200 converts the optical signal received into the electrical signal, the combiner/distributer 230 divides this signal into 3-port signals, the upstream down converter 224a down-converts the signals into 70 MHZ and sends this signal to the DQPSK demodulator 223a. The DQPSK demodulator 223a converts the 63-byte data into the 53-byte ATM cell, by using Reed-Solomon decoding algorithm(63, 53, t=5) which is one of FEC(forwarded error correction) method, and provides the ATM cell to the MAC processor 210. The MAC processor 210 analyzes the ATM cell. According to the cell analysis, the MAC processor 210 sends down the response to the MAC data directly, and sends the data to be sent to the network to the destination of the ATM cell through the network interface 150 after multiplexing the data into 155 Mbps.

Referring to FIG. 7, the MWCS 340 of the base station 300 frequency-convert the signal from the optical converter 310 and the distributer 320 into the microwave signal. The microwave signal is amplified by a solid state power amplifier(not shown) and is sent to sector antennas 350. Reversely, the MWCs 340 convert the microwave signal received from the customer premises equipment into the IF signal(400–700 MHz), and send the IF signal to the combiner 330. By way of the combiner 330, the NASU(network management system agency slave unit) 370 sends the status of the base station 300 to the NMS agency master unit 260 of the headend 200. The outdoor power supply unit(OPSU) 360 supplies every parts with a stable power source and reports its own status to the NASU 370. The sector antennas are arranged so that they can radiate the microwave signal in the different four directions.

In the following, a cell plan procedure in a wide band wireless multimedia communication system according to another embodiment of the present invention, will be described.

A wide band wireless multimedia communication system must cover the area as wide as possible by using the definite frequency resources. First, for a proper cell plan for a base station of a wide band wireless multimedia communication system, the frequency is computed, using a frequency reuse parameter K=1 method. The reason why the K=1 method is adapted for a cell plan is that this is a proper frequency arrangement structure in that both a base station and a subscriber do not affect each other in the same channel, because, when dividing the base station into two sectors, the base station uses a high frequency band of 26 GHz, and, in this case, the characteristics of a signal travel forms a line-of-sight. Therefore, the frequency arrangement(cell plan) example considering K=1 wave-deviation characteristics is shown in FIGS. 8 and 9.

Figure 8:
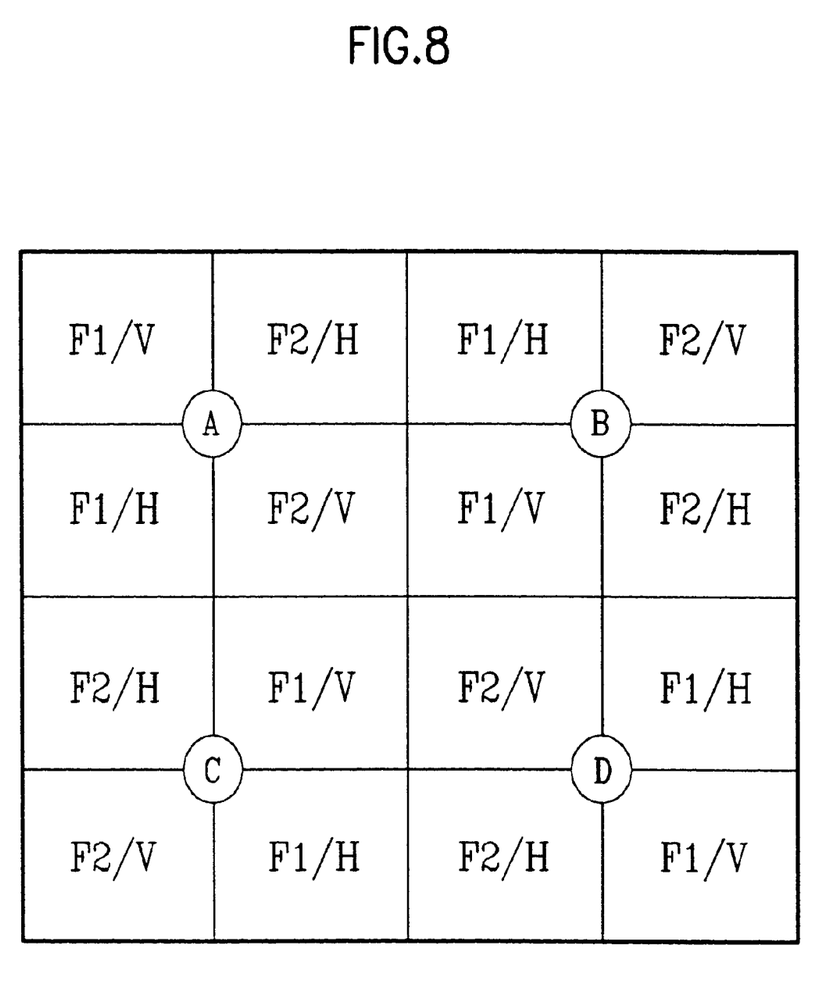
FIG. 8 shows a cell plan method when a base station uses the same frequencies at every two sectors.

FIG. 8 shows the method that K=1 frequency reuse pattern is adapted and the base station is divided into two frequencies per a cell. To extend more channels in the respective base station, only a channel for a sector can be extended. At this time, a channel must be extended so as to have wave-deviation characteristics, to ensure the sight distance between the customer premises equipment and the base station, or the communication quality. In FIG. 8, F1 and F2 stands for frequencies, and V and H stands for a vertical or horizontal wave-deviation characteristics. In the case of adopting this method, when channels are extended to the respective base station, the respective base station must be divided into two sectors and be given a wave-deviation characteristics.

In FIG. 8, V and H denotes the wave-deviation characteristics when the base station transmits the signal. When the subscriber end antenna radiates the wave, the antennas both of the base station and of the subscriber are disposed to have the opposite wave-deviation characteristics. In addition, the antennas of other base stations located in the diagonal direction of the above antennas must disposed to have the same wave-deviation characteristics.

Figure 9:
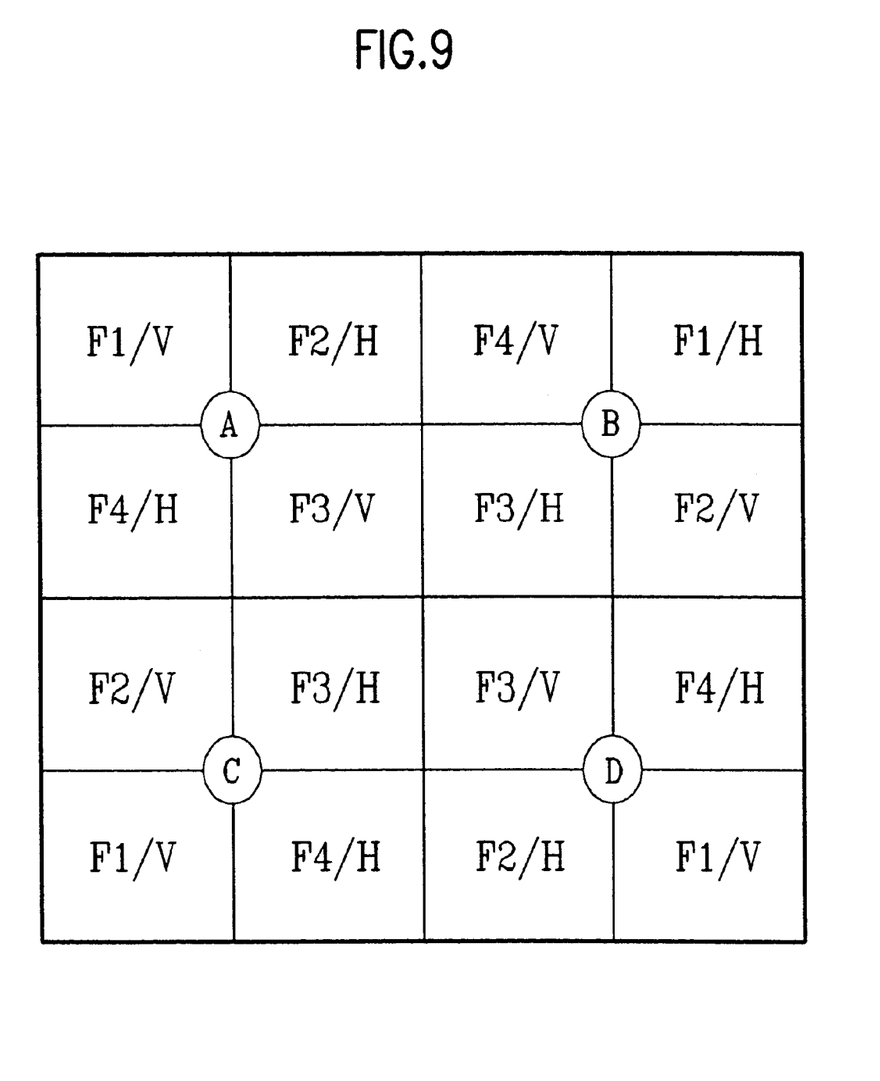
FIG. 9 shows a cell plan method when a base station uses different frequencies at every two sectors.

FIG. 9 shows a case that a K=1 frequency reuse pattern is adapted and the different frequency groups are used from sector to sector. To extend more channels in the respective base station, only a channel for a sector can be extended. At this time, a channel must be extended so as to have wave-deviation characteristics, to ensure the sight distance between the customer premises equipment and the base station, or the communication quality.

In FIG. 9, V and H denotes the wave-deviation characteristics when the base station transmits the signal. When the subscriber end antenna radiates the wave, the antennas both of the base station and of the subscriber are disposed to have the opposite wave-deviation characteristics. In addition, the antennas of other base stations located in the diagonal direction of the above antennas must disposed to have the same wave-deviation characteristics.

From the foregoing, according to a local multipoint distribution system of the present invention, the cost for installation and maintenance is reduced comparing to a cable multimedia communication system, and further, cable maintenance is unnecessary. The customer premises equipment can manage the information of subscribers, and a central office unit can manage the network of the base station and the subscribers. In addition, with a small investment, a wireless CATV service is possible, and also, a VOD(video on demand), NOD(news on demand), GOD(game on demand), PPV(pay per view), WLL(wireless local loop), and the other bidirectional multimedia services are possible. Moreover, when a cellular hub outdoor station is constructed, it is possible to reuse a frequency. When adapting this invention to a wireless CATV system within a 3 km radius area, the present invention exerts better broadcast quality than a cable CATV system.

What is claimed is:

1. An apparatus comprising:
  a first base station of a first cell comprising a plurality of antennas, wherein:
    each antenna transmits on one of two frequencies;
    each antenna is oriented in one of two opposite polarities;
    each antenna is directed to a sub-cell of the first cell;
    each sub-cell of the first cell is adjacent to at least two sub-cells of a base station that is not the first base station;
    each of said at least two sub-cells has an antenna that transmits one of the two frequencies that is not the same as the one of the two frequencies that the adjacent sub-cell of the first cell transmits; and
    each of said at least two sub-cells has an antenna that is oriented in one of the two opposite polarities that is the same as the one of the two frequencies that the adjacent sub-cell of the first cell is oriented.

2. The apparatus of claim 1, wherein each of the two frequencies is approximately 26 GHz.

3. The apparatus of claim 1, wherein each of the two opposite polarities is either vertical wave-deviation or horizontal wave-deviation.

4. The apparatus of claim 1, wherein the first base station comprises four antennas.

5. The apparatus of claim 4, wherein each of the four antennas has a different combination of polarity and frequency.

6. The apparatus of claim 1, wherein each of said at least two sub-cells are of different base stations.

7. A method comprising:
  configuring a first base station of a first cell to comprise a plurality of antennas, such that:
    each antenna transmits on one of two frequencies;
    each antenna is oriented in one of two opposite polarities;
    each antenna is directed to a sub-cell of the first cell;
    each sub-cell of the first cell is adjacent to at least two sub-cells of a base station that is not the first base station;
    each of said at least two sub-cells has an antenna that transmits one of the two frequencies that is not the same as the one of the two frequencies that the adjacent sub-cell of the first cell transmits; and
    each of said at least two sub-cells has an antenna that is oriented in one of the two opposite polarities that is the same as the one of the two frequencies that the adjacent sub-cell of the first cell is oriented.

8. The method of claim 7, wherein each oft he two frequencies is approximately 26 GHz.

9. The method of claim 7, wherein each of the two opposite polarities is either vertical wave-deviation or horizontal wave-deviation.

10. The method of claim 7, wherein the first base station comprises four antennas.

11. The method of claim 10, wherein each of the four antennas has a different combination of polarity and frequency.

12. The method of claim 7, wherein each of said at least two sub-cells are of different base stations.

* * * * *